Feb. 6, 1923. 1,444,142
B. B. STAUFFER.
GRAIN TRANSFERRING DEVICE FOR SEPARATORS.
FILED APR. 25, 1921. 4 SHEETS-SHEET 4

INVENTOR
Benjamin B. Stauffer
BY
ATTORNEYS

Patented Feb. 6, 1923.

1,444,142

UNITED STATES PATENT OFFICE.

BENJAMIN B. STAUFFER, OF CHICAGO, ILLINOIS.

GRAIN-TRANSFERRING DEVICE FOR SEPARATORS.

Application filed April 25, 1921. Serial No. 464,144.

*To all whom it may concern:*

Be it known that I, BENJAMIN B. STAUFFER, a citizen of the United States, and a resident of Chicago, in the county of Cook and State of Illinois, have invented a new and useful Improvement in Grain-Transferring Devices for Separators, of which the following is a full, clear, and exact description.

My invention relates to grain transferring devices, and it consists in the combinations, constructions and arrangements herein described and claimed.

An object of my invention is to provide a mechanical means for transferring grain or straw from a loaded wagon or stack to a desired place, as for instance, to a grain separator.

A further object of my invention is to provide in a device of the character described a novel means for transferring loose grain from a stack to conveying means arranged to discharge into a grain separator.

A further object of my invention is to provide a device of the character described having a grain carrying fork arranged for movement in a horizontal plane, whereby the fork may be moved the length of a stack and adjusted initially to shear grain from the top of the stack to a desired depth.

A further object of my invention is to provide a device of the character described in which the means for supporting a grain carrying fork for movement in a horizontal plane is adjusted vertically automatically as the height of the stack is decreased, whereby the fork will always be maintained in operative position with respect to the stack.

A further object of my invention is to provide a device of the character described that is arranged for operative connection with a grain separator of an ordinary type, whereby the device is driven by the latter.

A further object of my invention is to provide a device of the character described having a grain carrying fork supported for movement in a horizontal plane and means for automatically reversing the direction of movement of the fork to occasion the reciprocation of the latter along a track included in the supporting means.

A further object of my invention is to provide a device of the character described having a horizontally disposed conveyor positioned to receive grain from a fork and to discharge the grain to other conveying means from which the grain is fed into a grain separator.

A further object of my invention is to provide in a device of the character described means for automatically regulating the flow of grain to conveying means discharging into a grain separator, whereby the grain is fed to the separator uniformly.

A further object of my invention is to provide a device of the character described in which the mechanism for supporting a grain carrying fork is pivotally and detachably secured to the frame of the body portion of the device and may be swung into position to be supported at its free end by the body portion of the device, whereby the device can be readily moved from place to place.

Other objects and advantages will appear in the following specification, and the novel features of the invention will be particularly pointed out in the appended claims.

My invention is illustrated in the accompanying drawings, forming part of this application, in which—

Figures 2, 3, 4:
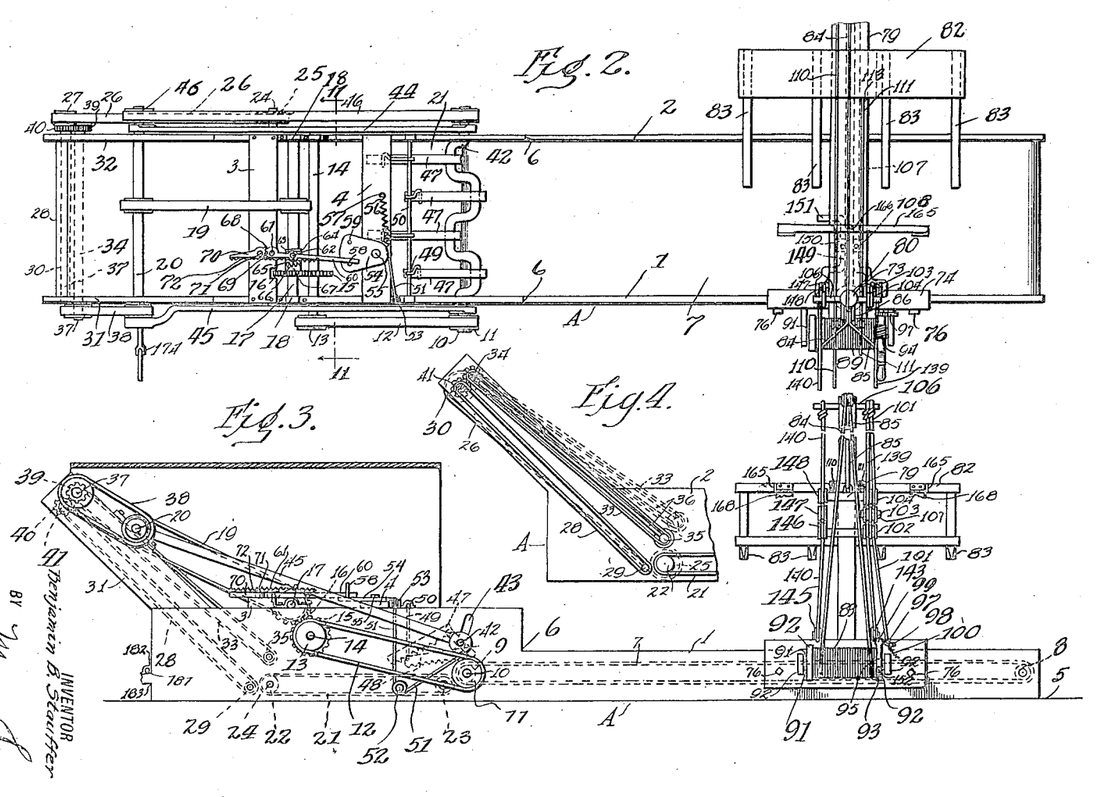
Figure 2 is a plan view of the device detached from a separator.
Figure 3 is a side elevation of the same.
Figure 4 is a side elevation of a fragmentary portion of the device.

In carrying out my invention, I provide a frame denoted generally at A consisting of edgewise disposed parallel side members 1 and 2 connected by transverse members, such as indicated at 3 and 4. Additional cross members (not shown) may be provided if required to rigidly maintain the side frame members 1 and 2 in the relative positions shown. The side members 1 and 2 are adapted to rest upon a level surface 5 and are cut away along their upper edges at 6—6. An endless belt conveyor 7 is mounted on a roller 8 journalled at its ends in the reduced portions of the side frame members 1 and 2 adjacent to the ends thereof and is passed around a similar parallel roller 9 journalled in the frame members 1 and 2 beyond the ends of the reduced portions, as best seen in Figure 3. Grain is delivered to the endless belt conveyor 7 by means which will be hereinafter described in detail. The shaft 10 of the roller 9 projects laterally of the side member 1 and has rigidly mounted thereon a pulley 11 driven by a belt connection 12 with a pulley 13 that is rigidly mounted on the projecting end of a shaft 14. The latter is journalled in side members 1 and 2, as shown in Figures 2 and 3, and has rigidly secured thereon a gear 15 in mesh with a gear 16 loosely mounted on an intermediate shaft 17. The intermediate shaft 17 is journalled in bearings 18 secured to the side members 1 and 2 and is driven by a belt and pulley connection denoted generally at 19 with a jack shaft 20 that is journalled in the side members 1 and 2 and has the ends thereof projecting laterally of these frame members.

The conveyor 7 discharges to a second conveyor 21 that comprises an endless belt mounted on spaced apart parallel rollers 22 and 23 journalled in the side frame members 1 and 2 and occupying a lower plane than that of the conveyor 7. The shaft 24 of the roller 22 extends laterally of the frame member 2 and has rigidly mounted thereon a pulley 25. A belt 26 engaged by a pulley 27 on a shaft 41 engages the pulley 25 to accomplish the driving of the conveyor 21. An inclined conveyor 28 has the form of an endless belt passed around a roller 29 that is journalled at its ends in the side members 1 and 2 in a position adjacent to the roller 22 and parallel therewith. The endless belt of the conveyor 28 is mounted on a roller 30 that is parallel with the roller 29 and is journalled at its ends between inclined extensions 31 and 32 to the side members 1 and 2, respectively. An inclined conveyor 33 arranged to cooperate with the conveyor 28 comprises an endless belt mounted on a roller 34 journalled at its ends in the extensions 31 and 32 parallel with the roller 30 and in a higher plane. The endless belt of the conveyor 33 is passed around a roller 35 journalled at its ends in relatively long arms 36—36 adjacent to the lower ends of the latter. The arms 36—36 are loosely mounted adjacent to their upper ends on the shaft 37 of the roller 34. The shaft 37 is driven by a belt and pulley connection denoted generally at 38 with the jack shaft 20 and has rigidly mounted thereon a gear 39 in mesh with a gear 40 rigidly mounted on the shaft 41 of the roller 30, whereby the conveyors 28 and 33 are driven at the same rate of speed in opposite directions. It is to be observed that the lower end of the conveyor 33 is positioned directly above the adjacent end of the conveyor 21 and consequently grain discharged by the conveyor 21 will be fed in between the conveyors 28 and 33 and carried by the united action of these two conveyors to the upper ends thereof for delivery as desired.

It is desirable that means be provided to control the flow of grain from the conveyor 7 to the conveyor 21 in order that the grain may be fed uniformly to a selected place. To this end, I provide a shaft 42 having the ends thereof extended through vertically extending slots 43—43 in the side frame members 1 and 2 and journalled in parallel arms 44 and 45 adjacent to the lower ends of the latter. The arms 44 and 45 are loosely mounted at their upper ends on the jack shaft 20, and the shaft 42 is driven by a belt and pulley connection indicated generally at 46 with the jack shaft 20. That portion of the shaft 42 disposed between the side members 1 and 2 has the form of a crank shaft and I shall hereinafter refer to the shaft 42 as a floating crank shaft, since it is free to move in a vertical plane. The crank shaft 42 has loosely mounted thereon a plurality of picker members 47, each having the under surface thereof serrated as at 48 and being suspended adjacent to its outer end by a link 49 from a transverse rod 50 that has its ends fixed in the frame members 1 and 2. It will thus be observed that the floating crank shaft 42 and the conveyor 7 will be driven at the same speed, since each is driven by connection with the jack shaft 20. The picker members 47 will therefore be oscillated at their forward ends so that alternate members engage the grain being moved by the conveyor 7 to project the grain into position to be engaged by the conveyor 21. As the quantity of grain moving along the conveyor 7 is increased, the floating crank shaft 42 will be moved upwardly. A cable 51 is secured at one end to the crank shaft 42 and is passed around idler sheaves 52 and 53 that are carried by the frame member 1, as best seen in Figures 2 and 3, the other end of the cable being secured to a clutch operating and latching plate 54. The latter is substantially triangular in shape, as shown in Figure 2, and is pivoted adjacent to its vertex as at 55 on the cross frame member 4. It is to be observed that the connection of the cable 51 with the clutch operating plate 54 is at the vertex of the latter and that the clutch operating plate is normally maintained in the position shown by the balanced stresses placed thereon by the weight of the crank shaft 42 and the tension of a spring 56 that is secured at 57 to the cross frame member 4 at one end and at its other end to the latching plate 54 adjacent to the connection of the latter with the cable. The latching plate 54 is provided with upstanding spaced apart pins 58 and 59 serving as stop members for a lever 60 that is fulcrumed at 61 on the cross frame member 3. The lever 60 is formed intermediately to provide an integral yoke 62 having fingers arranged to enter a relatively wide peripheral groove 63 in a clutch collar 64 that is feathered to the intermediate drive shaft 17 and movable therealong. The clutch collar 64 is formed with one end wall thereof provided with teeth 65 adapted to engage with cooperating teeth 66 in the hub 67 of the gear 16 that is loosely mounted on the intermediate drive shaft 17. The lever 60 has its end portion that is pivoted to the frame member 3 enlarged and provided with teeth 68 in mesh with cooperating teeth 69 of a locking arm 70 that is pivoted at 71 on the cross frame member 3, as best seen in Figure 2. A spring 72 is connected at one end to the free end of the locking arm 70 and at its other end to the lever 60 intermediate the yoke portion thereof and its free end, and exerts a tension on the lever 60 and the locking arm 70 that tends to maintain the same in the position illustrated, whereby the clutch collar 64 is mainetained in engagement with the hub 67 and the conveyor 7 is operated at the same speed and coincidently with the crank shaft 42. As the floating crank shaft 42 is moved upwardly on account of the quantity of grain passing between it and the conveyor 7 being increased, a stress will be imparted to the clutch operating plate 54, tending to move the latter about its pivot against the tension of the spring 56. As the clutch operating plate is moved, the pin 58 which is in contact with the lever 60 will force the latter before it and occasion a movement of the lever 60 about its pivot 61 against the tension of the spring 71. Consequently, the fingers of the yoke 62 will be moved across the annular groove 63 in the clutch collar 64. Since the peripheral groove 63 is relatively wide, the movement of the yoke 62 will not occasion a movement of the clutch collar 64 until the lever 60 and the cooperating arm 70 have been moved about their respective pivots so that the tension of the spring 71 will aid in moving the clutch collar 63 along the intermediate drive shaft 17 so that the gear 16 will be disengaged. The conveyor 7 will then be at rest until the stress has been removed from the clutch operating plate 54, as when the quantity of grain projected by the picker members 47 to the conveyor 21 has been diminished so that the floating crank arm 42 returns to normal position. At this time, the tension of the spring 56 will return the clutch operating plate 54 to the position illustrated in Figure 2, and the pin 59 will contact with the lever 60 to effect the return of the clutch collar 64 to the position illustrated, when the conveyor 7 will be again driven.

The outer portion of the conveyor 7 and the reduced portions of the frame members 1 and 2 provide a platform adapted to receive the grain. Heretofore, in devices of which I am aware, it has been necessary for the operator to place the grain on the conveyor manually or to adjust means provided for carrying grain to the conveyor at each operation of such means. The means provided in my improved device for transferring grain to the conveyor 7 are adjusted automatically to occasion the delivery of a like quantity of grain to the conveyor 7 at each operation thereof, and will operate mechanically. Such means include a standard 73 carried by a base 74 that has a slot 75 in its lower surface adapted to receive the side member 1. The base 74 will be maintained in adjusted position on the side member 1 by its weight and the weight of the parts carried thereby, although I may provide auxiliary means, such as set screws 76 projected through the base 74 into engagement with said means to insure a more rigid connection between the standard 73 and the frame A. A cooperating standard 77 is positioned at a determined distance from the standard 73 and is carried by a base 78. A vertically adjustable horizontally disposed track 79 is formed with parallel vertical openings 80 and 81 therethrough adjacent to its opposite ends, these openings being adapted to loosely receive the standards 73 and 77 respectively. The track 79 has the form of an I-beam and mounted for movement therealong is a frame 82 of a fork having slightly inclined spaced apart tapering arms 83 secured to the under side thereof to project toward the standard 73. It is to be noted that the frame 82 is mounted intermediately on the track 79, whereby the resistance of the frame to stress placed thereon by work engaged, is maintained at a maximum. The track 79 is maintained in adjusted position by means of cables 84 and 85, as will now be explained. The cable 84 is threaded through guide pulleys 86 and 87 carried by the standards 73 and 77, respectively, adjacent to their upper ends and is secured at one end to the track 79, as at 88, and has its other end secured to a drum 89 after being wound around the latter a number of times. The cable 85 is secured at one end to the proximal end of the track 79, as at 90, and is threaded through the guide pulley 86 for engagement with the drum 89 after being wound around the latter a plurality of times. The drum 89 is mounted on a shaft 91 journalled in brackets 92—92 carried by the base 74. A pinion 93 rigidly mounted on the shaft 91 engages a worm 94 that is integral with a crank 95 that is journalled at one end thereof in the base 74 and maintained in constant engagement with the pinion 93 by a strap 96. The latter is mounted at its ends on the shaft 91. Obviously, the engagement of the worm with the pinion will normally lock the drum against movement. Movement of the drum in one direction is effected automatically by means of a pawl 97 that is pivoted at one end to the base, as at 98, and normally maintained out of engagement with a ratchet 99 rigidly mounted on the crank 95, by the tension of a spring 100. A cable 101 is connected at one end with the pawl 97 and a pull on the cable will cause the pawl to engage the ratchet 99, thereby rotating the latter. The cable 101 is threaded around a guide pulley 102 carried by the track 79 adjacent to its lower edge, an intermediate guide pulley 103, and a guide pulley 104 carried by the track 79 adjacent to its upper edge, and is then secured at 105 to a cross beam 106 carried by the standard 73 at its upper end. The intermediate guide pulley 103 is carried at the end of a slidable rod 107 that is supported for movement along the track 79 by guiding and retaining brackets 108 secured to the web of the track. The slidable rod 107 has a laterally extending trigger 109 at the end thereof remote from the standard 73 and provides a means for actuating the cables 84 and 85 which operate the track 79. The frame 82 of the fork contacts with the trigger 109 near the end of its movement toward the standard 77 and occasions a stress on the cable 101. When the stress is removed from the cable, as when the frame 82 is moved toward the standard 73, the action of the spring 100 will return the slidable rod 107 to initial position, whence it may be actuated again upon the return movement of the fork frame 82.

The reciprocation of the fork frame 82 is occasioned by cables 110 and 111, as will now be described. The cable 110 is connected at one end to the side of the fork frame 82 that is remote from the standard 73, as at 112. The cable 111 is connected to the proximate side of the fork frame 82, as at 113. The cables 110 and 111 are threaded through guide sheaves 114 and 115 respectively carried by a block 116 that is anchored in a desired position relative to the standard 73 and these cables are then passed around a guide sheave 117 disposed on a separator 118 (see Figures 1 and 7). The cable 110 is then wound around a drum 119 that is rigidly mounted on a shaft 120 journalled in the sides of the separator and is secured at its end to the drum 119. The cable 111 is wound around a similar drum 121 that is mounted on a shaft 122 and is secured at its end to the drum 121. The shaft 122 is journalled in the sides of the separator and is positioned with respect to the shaft 120 so that both the shaft 120 and the shaft 122 may be driven by means of an intermediately disposed shaft 123. The shaft 123 has disposed thereon a pair of spaced apart clutch collars or sleeves 124 and 125. The clutch sleeve 124 has rigidly mounted thereon a gear 126 in mesh with a gear 127 rigidly mounted on the shaft 122. The clutch sleeve 125 likewise has a gear 128 rigidly mounted thereon and this gear is in mesh with a gear 129 rigidly mounted on the shaft 120. A double-acting clutch collar 130 is feathered to the shaft 123 intermediate the clutch sleeve 124 and the clutch sleeve 125 and is provided with teeth 131 at one end thereof adapted for engagement with cooperating teeth 132 on the adjacent end of the clutch sleeve 124. The clutch collar 130 is provided with teeth 133 at its other end adapted for engagement with teeth 134 on the adjacent end of the clutch sleeve 125. Obviously, the clutch collar may be selectively moved into engagement with the clutch sleeve 124 or the clutch sleeve 125 to occasion the operation of either the drum 119 or the drum 121. It is desirable that the drums 119 and 121 be positively operated or driven alternately in order to occasion the reciprocation of the fork frame 82 along the track 79. To this end, I provide a clutch controlling mechanism that is substantially identical with the clutch controlling mechanism described as being applied to the clutch collar 63. It is to be observed that a lever 135 is pivoted adjacent to one end thereof on a support 136 that is secured to the separator frame in a desired position with respect to the clutch collar 130. The lever 135 is formed with a yoke portion 137 intermediate its length having fingers arranged to enter a groove 138 in the periphery of the clutch collar 130. Attached to the free end of the lever 135 at opposite sides thereof are cables 139 and 140. The cable 139 is passed around a guide sheave 141 that is carried by the separator and is conducted through a guide sheave 142 on the block 116 through a guide sheave 143 carried by the base 74 and then around the pulley 102, the intermediate pulley 103, the upper pulley 104 and secured at its end to the cross bar 106. The cable 140 is passed around a guide sheave 144 on the block 116, a guide sheave 145 on the base 74 and then through a lower pulley 146 that is secured to the track 79 in the same relative position as the pulley 102 and at the opposite side thereof. The cable 140 is threaded through an intermediate pulley 147 and an upper pulley 148 that correspond respectively with the pulleys 103 and 104 and is then secured at its end to the cross bar 106, as best seen in Figure 3. The intermediate pulley 147 is carried at the end of a slidable rod 149 (see Figure 2) that is guided and retained by the bracket 150 secured to the web of the track 79. The slidable rod 149 provides a means for actuating the cable 140 and to this end is bent laterally at its end to provide a trigger 151 that is arranged to be engaged by the fork frame 82 when the latter is near the end of its movement toward the standard 73.

From the foregoing description of the various parts of the device, the operation thereof may be readily understood. The track 79 is adjusted vertically initially by operation of a crank arm 152 of the crank 95 with respect to the height of a mass of grain, such as the stack 153 that is to be transferred from the stack to a desired place, as for instance, to the separator 118. The track is adjusted so that forward movement of the fork frame 82 will result in a quantity of the grain being sheared from the top of the stack and carried upon the fork arms 83 to the conveyor 7. Reciprocation of the fork frame 82 is occasioned by a positive movement of the drums 119 and 121 alternately. Such a driving force is imparted to each drum from the shaft 123 through the clutch members and the gears hereinbefore described. The shaft 123 has mounted thereon a sprocket 154 that is driven by a chain 155 that is engaged by a sprocket 156 mounted on an intermediate drive shaft 157. It is to be observed that the chain 155 is passed around an idler sprocket 158 that is arranged to rotate freely on the extended end of a stub shaft 188, then around the sprocket 154 and around an idler sprocket 159 that is arranged to rotate freely on the extended end of a stub shaft 189. The intermediate drive shaft 157 is driven by chain and sprocket connection indicated generally at 160 with a jack shaft 161 that is an ordinary part of the separator 118 and is driven by the usual means.

Figures 5, 6, 7:
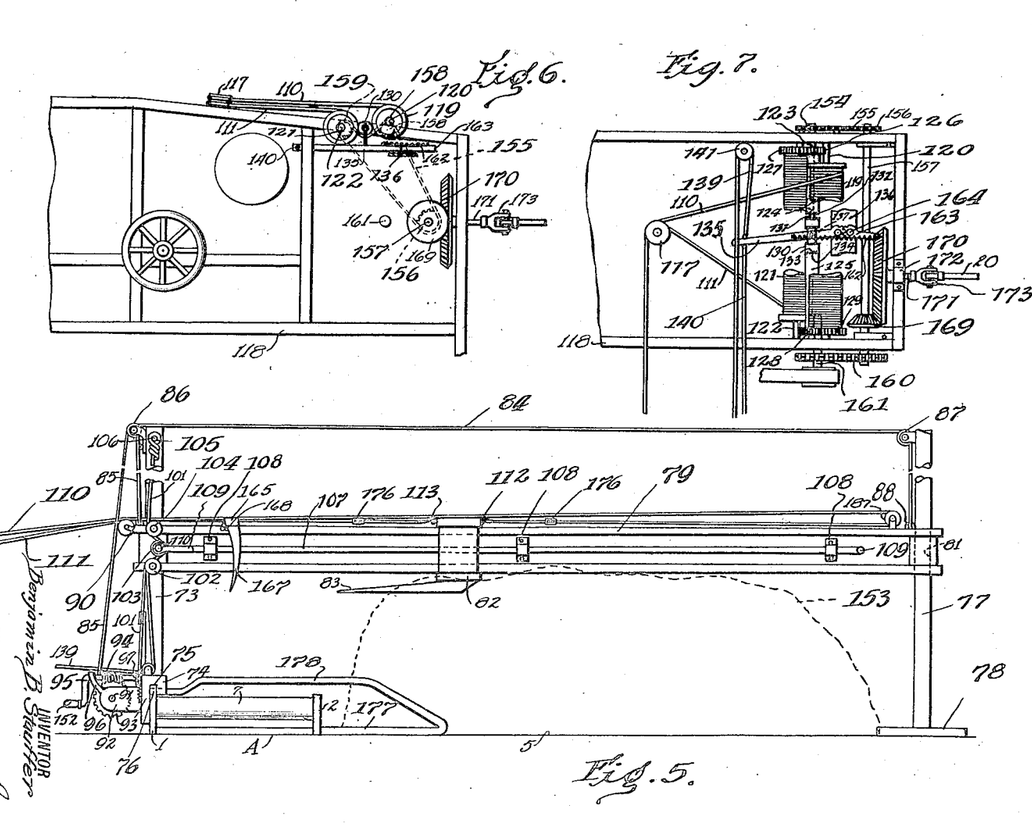
Figure 5 is a side elevation of another portion of the device.
Figure 6 is a side elevation of an element of the device attached to a grain separator to which the device is applied.
Figure 7 is a plan view of the mechanism shown in Figure 6.

The clutch collar 130 is moved by the lever 135 into engagement with the clutch sleeves 124 and 125 alternately. When the drum 119 is being positively rotated by a driving force imparted thereto from the shaft 123, the drum 121 will be rotated oppositely by a stress placed thereon by the cable 110, since a stress will be communicated along the cable 110 on account of the movement of the fork frame 82, to which the cables 110 and 111 are connected. Obviously, when the drum 121 is being driven by the shaft 123, the direction of movement of the drum 119 will be reversed. The clutch collar 130 will be maintained in engagement selectively with either the clutch sleeve 124 or the clutch sleeve 125 by the action of a spring 162 that is connected at one end to the lever 135 intermediate the length of the latter and at its other end to a cooperating arm 163 that is pivoted at 164 on the support 136. The lever 135 and the arm 163 are provided with teeth in their adjacent ends arranged to be constantly inter-meshed, as is best seen in Figure 7.

As the fork frame 82 is moved forwardly, a quantity of loose grain will be carried by the fork arms 83 toward the standard 73. The fork frame contacts the trigger 151 near the end of its movement forwardly, thereby occasioning a pull on the cable 140 and operating the lever 135 to move the latter into the position shown in Figure 7, whereby the drum 119 is rotated. The direction of movement of the fork frame will be reversed and the latter will be moved toward the standard 77. Near the end of its travel toward the standard 73, the fork frame will contact the trigger 109, thereby occasioning a pull on the cable 139 and operating the lever 132 and causing the clutch collar 134 to disengage the clutch sleeve 135 and to engage the clutch sleeve 124. The drum 121 will then be driven and the direction of movement of the fork frame will again be reversed so that the fork frame will travel toward the standard 73. Coincidently with the reversal of movement of the fork frame to travel toward the standard 73, the cable 101 will be actuated to partially rotate the drum 89, thereby lowering the track 79 a predetermined distance which will be determined by the engagement of the pawl 97 with the ratchet 99 as the engagement of the worm 94 with the pinion 93 will lock the drum against movement when the pawl disengages the ratchet 99.

The grain carried forwardly by the fork will be deposited on the belt conveyor 7 at the outer end thereof. To insure the removal of all grain from the fork when the latter is moved toward the standard 77, I provide a raking member comprising a frame 165 pivoted intermediately at 166 on the track 79 and provided with a plurality of swinging teeth 167 connected to the frame by flexible links 168. The teeth 167 are curved, as shown in Figure 5, and are arranged to swing freely toward the standard 73 and to be maintained in substantially vertical position when a stress is applied thereto that would tend to move the same toward the standard 77. This object is attained by forming the teeth 167 with plane upper surfaces adapted to contact with the under surface of the frame 165 when the lower ends thereof are swung toward the standard 77. The teeth 167 depend between the fork arms 83 and rake the grain carried thereby from the fork so that the latter falls upon the conveyor 7.

The grain is then carried along the conveyor 7 and delivered to the conveyor 21 and thence between the inclined conveyors 28 and 33. The latter discharges the grain to a desired place, as for instance, to a self-feeder (not shown) of the separator 118.

It will be understood that the conveyor 33 will swing upwardly about its upper end from the position shown in the full lines in Figure 4 to the position indicated by the dotted lines as the quantity of grain delivered by the conveyor 21 is increased. The grain will be delivered uniformly to the separator, since the movement of the conveyor 7 will be stopped by the means hereinbefore described when an excessive quantity of grain is passing beneath the floating crank shaft 42.

Figure 1:
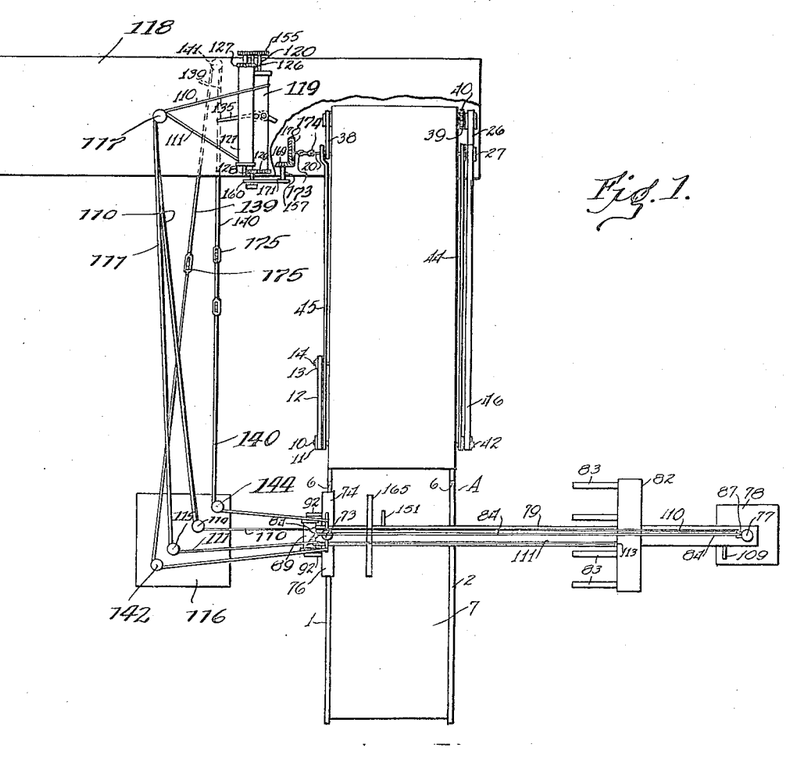
Figure 1 is a plan view, mainly diagrammatic, showing the device operatively applied to a separator.

In service, the frame of the device will be positioned with respect to the separator 118 as shown in Figure 1. The jack shaft 20 is operatively connected with the shaft 157. The latter has mounted thereon a gear 169 that is in mesh with a relatively large gear 170 rigidly mounted on a shaft 171 journalled in a bracket 172 secured to the frame of the separator. The shaft 171 is connected by two universal joints 173 and 174 to the jack shaft 20. The frame of the device may therefore be positioned at varying angles to the separator and it is only necessary to disengage the jack shaft 20 from the shaft 171 as for instance, by removing a pin of either the universal joint 173 or the universal joint 174 to permit the removal of the device with respect to the separator. The cables 140 and 139 are made up of a plurality of portions connected by adjustable connectors, such as turn buckles 175. The cables 110 and 111 are likewise made up of a plurality of portions connected by adjustable portions, such as turn buckles 176 (see Figure 5). Consequently, the track 79 may be swung about the standard 73 to rest upon the frame of the device when it is desired to move the same.

When practically all of the grain has been transferred from the stack 153 to the belt conveyor 7 it is necessary to provide means for preventing the contact of the fork arms with the side 2 and for raising the fork to insure the discharge of the grain on the belt conveyor. To this end, I provide a pair of guide members 177, each having a lower arm secured to the side 2 and an upper arm 178 arranged to extend transversely across the conveyor 7 and in a slightly higher plane. The upper arms 178 are inclined downwardly adjacent to their outer ends so that the fork will be guided upwardly into a plane above the side frame member 2.

Figure 8:
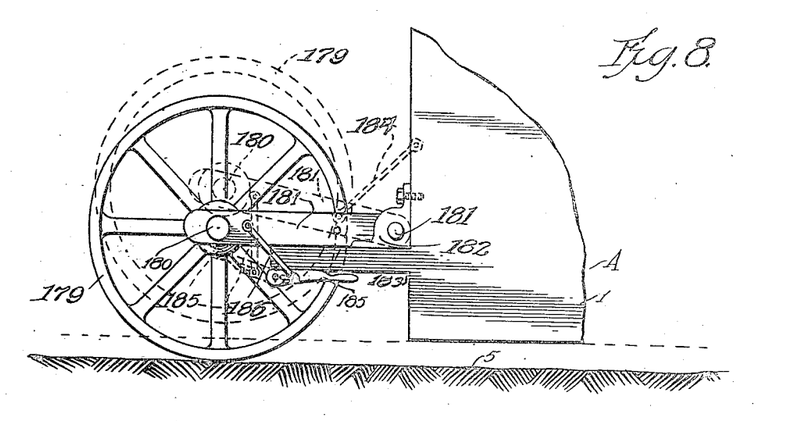
Figure 8 is an enlarged detail of a portion of the frame, showing the means for mounting the device for movement.
Figure 9:
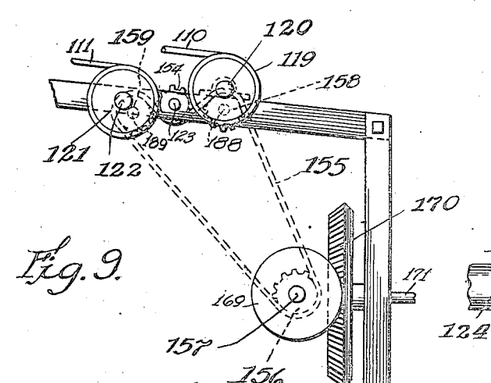
Figures 9 and 10 are details of portions of the mechanism for controlling the operation of the grain transferring fork and, Figure 11 is a section along the line 11—11 of Figure 2.
Figure 10:
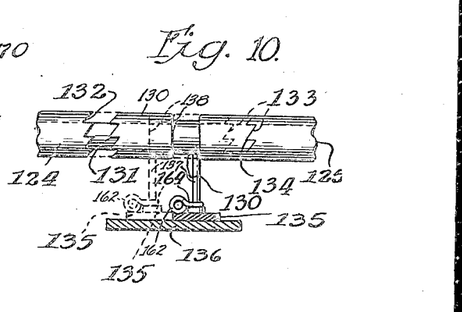
Figure 11:
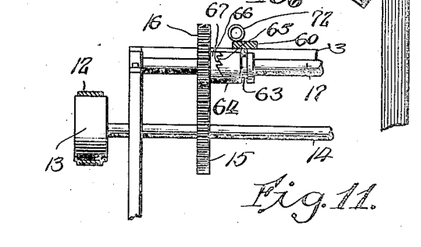

When it is desired to move the device, the reduced end portions of the side members 1 and 2 are placed upon a suitable vehicle (not shown). The opposite end of the frame will be movably supported upon wheels 179 carried by an axle 180 that is disposed between spaced apart parallel arms 181. The latter are pivoted at their inner ends to the frame members 1 and 2 respectively, as to lugs 182 carried by the latter. It will be noted that the side frame members 1 and 2 are cut away at 183 and that the arms 181 will be maintained in the position indicated by the dotted lines in Figure 8, as by suitable fastening means, such as indicated at 184 when the device is operatively connected with the separator 118. Operation of the lever 185 which is connected by a link 186 with the arms 181 will occasion a movement of the arms 181 from the position indicated by the dotted lines in Figure 8 into the position shown by the full lines, whereby the device may be moved as desired. It is to be observed that the stress on the links 186 when the arms 181 are in the position shown by the full lines will tend to maintain these arms in that position.

It is observed that the cable 110 is passed through a guide sheave 187 positioned at the remote end of the track 79 so that a pull on the cable 110 will move the fork frame toward the standard 77.

I claim:

1. In a grain transferring device, a frame having vertically edgewise disposed side members, a vertical standard positioned in adjusted position along one side of the frame, a second vertical standard positioned a spaced distance from the first named standard, a vertically adjustable track carried by said standards to extend across the frame, a fork arranged for reciprocation along the track, said fork being provided with arms adapted to shear grain from a stack contacted thereby during the movement of the fork toward the frame, and means for reciprocating the fork.

2. In a grain transferring device, a frame having vertically edgewise disposed side members, a vertical standard positioned in adjusted position along one side of the frame, a second vertical standard positioned a spaced distance from the first named standard, a vertically adjustable track carried by said standards to extend across the frame, a fork arranged for reciprocation along the track, said fork being provided with arms adapted to shear grain from a stack contacted thereby during the movement of the fork toward the frame, mechanical means for reciprocating the fork, and means arranged to be actuated by the fork to automatically adjust the position of the track at the end of each reciprocation of the fork.

3. In a grain transferring device, a frame having vertically edgewise disposed side members, a vertical standard positioned in adjusted position along one side of the frame, a second vertical standard positioned a spaced distance from the first named standard, a vertically adjustable track carried by said standards to extend across the frame, a fork arranged for reciprocation along the track, said fork being provided with arms adapted to shear grain from a stack contacted thereby during the movement of the fork toward the frame, mechanical means for reciprocating the fork, means arranged to be actuated by the fork to automatically adjust the position of the track at the end of each reciprocation of the fork, and means carried by the frame for guiding the fork upwardly over the proximate side of the frame when the track is positioned below the plane of the upper edge of the proximate side of the frame.

4. In a grain transferring device, a frame having vertically edgewise disposed side members, a vertical standard positioned in adjusted position along one side of the frame, a second vertical standard positioned a spaced distance from the first named standard, a vertically adjustable track carried by said standards to extend across the frame, a fork arranged for reciprocation along the track, said fork being provided with arms adapted to shear grain from a stack contacted thereby during the movement of the fork toward the frame, mechanical means for reciprocating the fork, means arranged to be actuated by the fork to automatically adjust the position of the track at the end of each reciprocation of the fork, and means carried by the track for raking from the fork any grain carried thereby when the fork is moved away from the frame.

5. In a grain transferring device, a frame having vertically edgewise disposed side members, a vertical standard positioned in adjusted position along one side of the frame, a second vertical standard positioned a spaced distance from the first named standard, a vertically adjustable track carried by said standards to extend across the frame, a fork arranged for reciprocation along the track, said fork being provided with arms adapted to shear grain from a stack contacted thereby during the movement of the fork toward the frame, separate means for alternately imparting a movement to the fork in opposite directions along the track, means actuated by the fork for controlling the operation of the means for moving the fork, and means actuated by the fork for lowering the track at the end of each reciprocation of the fork.

6. A device of the type described comprising conveying means for delivering grain to a thresher, a fork movable in a horizontal plane for conveying grain from a stack to said conveying means, means for lowering said fork at the end of each trip, and means operatively connected to the thresher for actuating said fork.

7. A device of the type described comprising conveying means for delivering grain to a thresher, a fork movable in a horizontal plane for conveying grain from a stack to said conveying means, means actuated by the threshing machine for moving said fork toward and away from said conveying means, and means for automatically lowering said fork when it is furthest removed from said conveying means.

8. A device of the type described comprising two vertical supports, a horizontal bar slidably disposed on said supports, a fork slidably carried by said bar, actuating means controlled by the movement of said fork for reciprocating the fork, and means actuated by the fork for lowering the bar after each cycle of said fork.

9. A device of the type described comprising two vertical supports, a horizontal bar slidably carried by said supports, a fork slidably carried by said bar, a trigger disposed at each end of said bar and adapted to be actuated by said fork, means controlled by said triggers for reciprocating said fork, and means supporting said bar, said means being operatively connected to one of said triggers to move said bar downwardly a predetermined distance when said fork strikes said trigger.

BENJAMIN B. STAUFFER.